(12) United States Patent
Miller et al.

(10) Patent No.: US 8,571,038 B2
(45) Date of Patent: Oct. 29, 2013

(54) METHOD TO TUNNEL UDP-BASED DEVICE DISCOVERY

(75) Inventors: Daryl R. Miller, Rancho Santa Margarita, CA (US); David L. Wagstaff, Lake Forest, CA (US); Kaori Kuwata, San Juan Capistrano, CA (US)

(73) Assignee: Lantronix, Inc., Irvine, CA (US)

( * ) Notice: Subject to any disclaimer, the term of this patent is extended or adjusted under 35 U.S.C. 154(b) by 157 days.

(21) Appl. No.: 12/877,907

(22) Filed: Sep. 8, 2010

(65) Prior Publication Data
US 2011/0026531 A1 Feb. 3, 2011

Related U.S. Application Data

(63) Continuation-in-part of application No. PCT/US2008/081191, filed on Oct. 24, 2008.

(60) Provisional application No. 60/982,388, filed on Oct. 24, 2007.

(51) Int. Cl.
*H04L 12/28* (2006.01)

(52) U.S. Cl.
USPC .......... 370/395.53; 370/230; 370/395.2; 370/395.6; 370/401; 370/466

(58) Field of Classification Search
USPC .......... 370/230, 352, 395.2–395.6, 401, 466; 709/223, 245
See application file for complete search history.

(56) References Cited

U.S. PATENT DOCUMENTS

| | | | |
|---|---|---|---|
| 5,790,548 A * | 8/1998 | Sistanizadeh et al. | 370/401 |
| 6,128,664 A * | 10/2000 | Yanagidate et al. | 709/228 |
| 6,523,068 B1 * | 2/2003 | Beser et al. | 709/238 |
| 6,701,437 B1 * | 3/2004 | Hoke et al. | 726/15 |
| 6,829,250 B2 * | 12/2004 | Voit et al. | 370/467 |
| 6,948,003 B1 * | 9/2005 | Newman et al. | 709/250 |
| 7,159,242 B2 * | 1/2007 | Genty et al. | 726/14 |
| 7,274,684 B2 * | 9/2007 | Young et al. | 370/352 |
| 7,366,188 B2 * | 4/2008 | Kim | 370/401 |
| 7,706,401 B2 * | 4/2010 | Bae et al. | 370/466 |
| 7,921,197 B2 * | 4/2011 | Soundararajan | 709/223 |
| 7,949,785 B2 * | 5/2011 | Alkhatib et al. | 709/245 |
| 8,065,418 B1 * | 11/2011 | Abuan et al. | 709/227 |
| 8,085,758 B2 * | 12/2011 | Ramachandran et al. | 370/352 |
| 2001/0023459 A1 * | 9/2001 | Asami | 709/245 |
| 2002/0038339 A1 * | 3/2002 | Xu | 709/203 |
| 2002/0141390 A1 * | 10/2002 | Fangman et al. | 370/352 |
| 2002/0150083 A1 * | 10/2002 | Fangman et al. | 370/352 |
| 2002/0198840 A1 * | 12/2002 | Banka et al. | 705/50 |

(Continued)

*Primary Examiner* — Andrew Lai
*Assistant Examiner* — Andrew C Lee
(74) *Attorney, Agent, or Firm* — Rutan & Tucker LLP; Hani Z. Sayed

(57) ABSTRACT

A method, apparatus, and system are described for a central station to allocate virtual IP addresses. A device service manager server (DSM) has a network access module configured to cooperate with two or more device service controllers (DSCs). The DSM serves as a central management station for allocating and assigning Virtual IP addresses to network devices to proxy communications for networked devices on a local area network (LAN) where each DSC resides. The DSM is located exterior from the network devices on the LAN where communications associated with the assigned VIP addresses are being routed to. The DSM assigns a Virtual IP Addresses to each DSC and establishes a route from the assigned Virtual IP address to a destination network device on a LAN, based on corresponding DSC and network device information stored in a registry of the DSM.

12 Claims, 12 Drawing Sheets

(56) References Cited

U.S. PATENT DOCUMENTS

| | | | |
|---|---|---|---|
| 2003/0233454 A1* | 12/2003 | Alkhatib et al. | 709/226 |
| 2004/0249911 A1* | 12/2004 | Alkhatib et al. | 709/223 |
| 2004/0249974 A1* | 12/2004 | Alkhatib et al. | 709/245 |
| 2007/0258464 A1* | 11/2007 | Hall et al. | 370/395.52 |
| 2008/0201763 A1* | 8/2008 | Lynn et al. | 726/1 |
| 2009/0016360 A1* | 1/2009 | Kurita | 370/397 |
| 2009/0168787 A1* | 7/2009 | Ansari et al. | 370/401 |

* cited by examiner

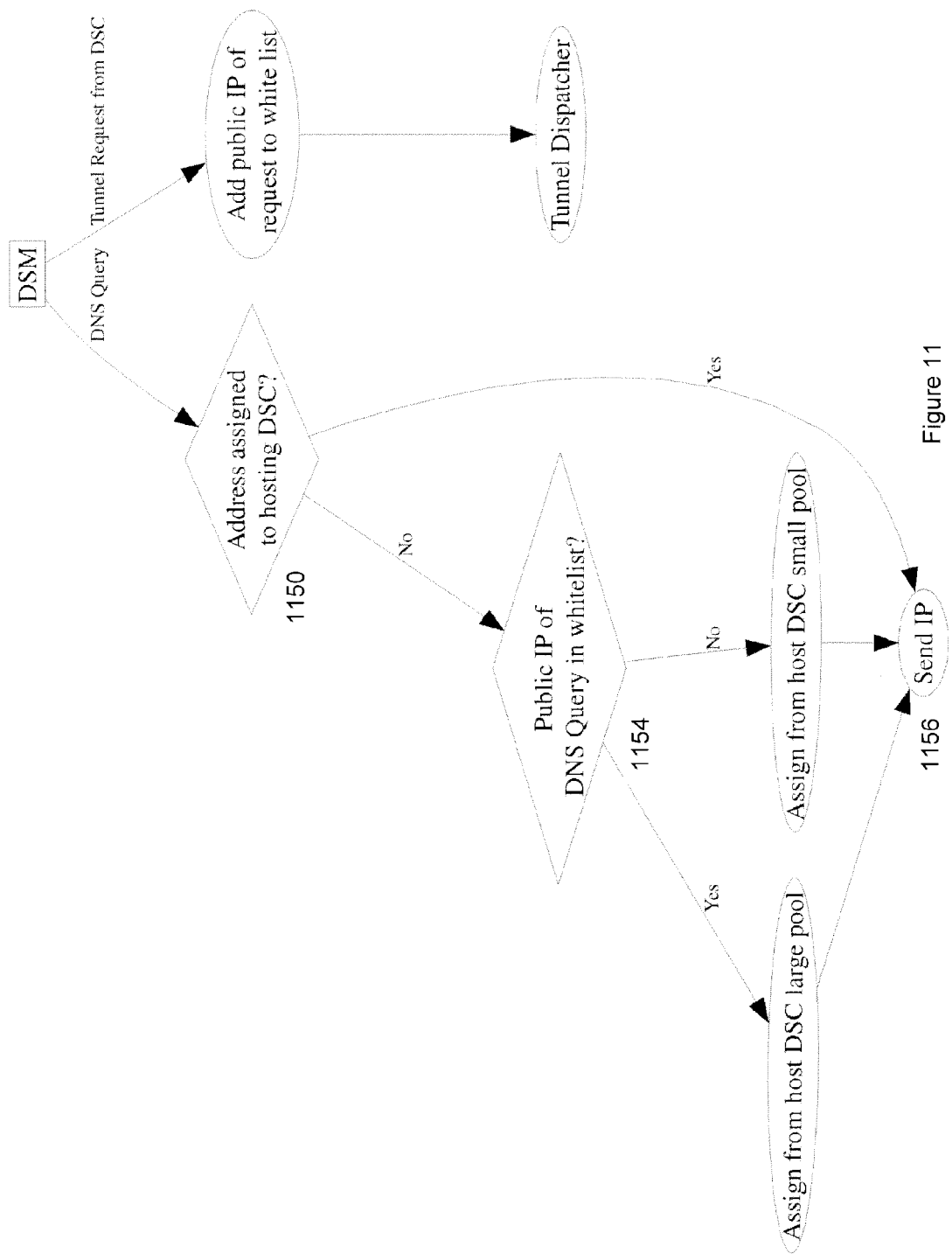

METHOD TO TUNNEL UDP-BASED DEVICE DISCOVERY

RELATED APPLICATIONS

This application is a continuation-in-part which claims the benefit of U.S. PCT Patent Application No. PCT/US2008/081191 filed on Oct. 24, 2008 and U.S. Provisional Patent Application Ser. No. 60/982,388, entitled "Means of providing virtual IP address to automatically access remote network devices" filed Oct. 24, 2007.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network devices. More particularly, an aspect of an embodiment of the invention relates to a method to tunnel UDP-based device discovery.

BACKGROUND OF THE INVENTION

The challenge of establishing remote access for service organizations lies in overcoming two major hurdles. The first being the need to establish remote access within the parameters of a secure firewall. Firewall configuration is typically based on conservative thinking and designed to be rigorous in defending information and access. Data security is the leading obstacle to remote monitoring and control because a company's security policies are critical to business operations and cannot be hampered, even to increase company profitability. Therefore, the integrity of firewalls must be maintained. Typically, changing security specifications in order to allow for remote access is not an option.

SUMMARY OF THE INVENTION

A method, apparatus, and system are described for a method to tunnel UDP-based device discovery. A device service manager server (DSM) has a network access module configured to cooperate with two or more device service controllers (DSCs). The DSM serves as a central management station for allocating and assigning Virtual IP addresses to network devices to proxy communications for networked devices on a local area network (LAN) where each DSC resides. The DSM is located exterior from the network devices on the LAN where communications associated with the assigned VIP addresses are being routed to. The DSM assigns a Virtual IP Addresses to each DSC and establishes a route from the assigned Virtual IP address to a destination network device on a LAN, based on corresponding DSC and network device information stored in a registry of the DSM.

BRIEF DESCRIPTION OF THE DRAWINGS

The drawings refer to embodiments of the invention in which:

FIG. 11 illustrates a diagram of a DSM creating two or more pools of virtual IP address available in the local network.

Figure 1:
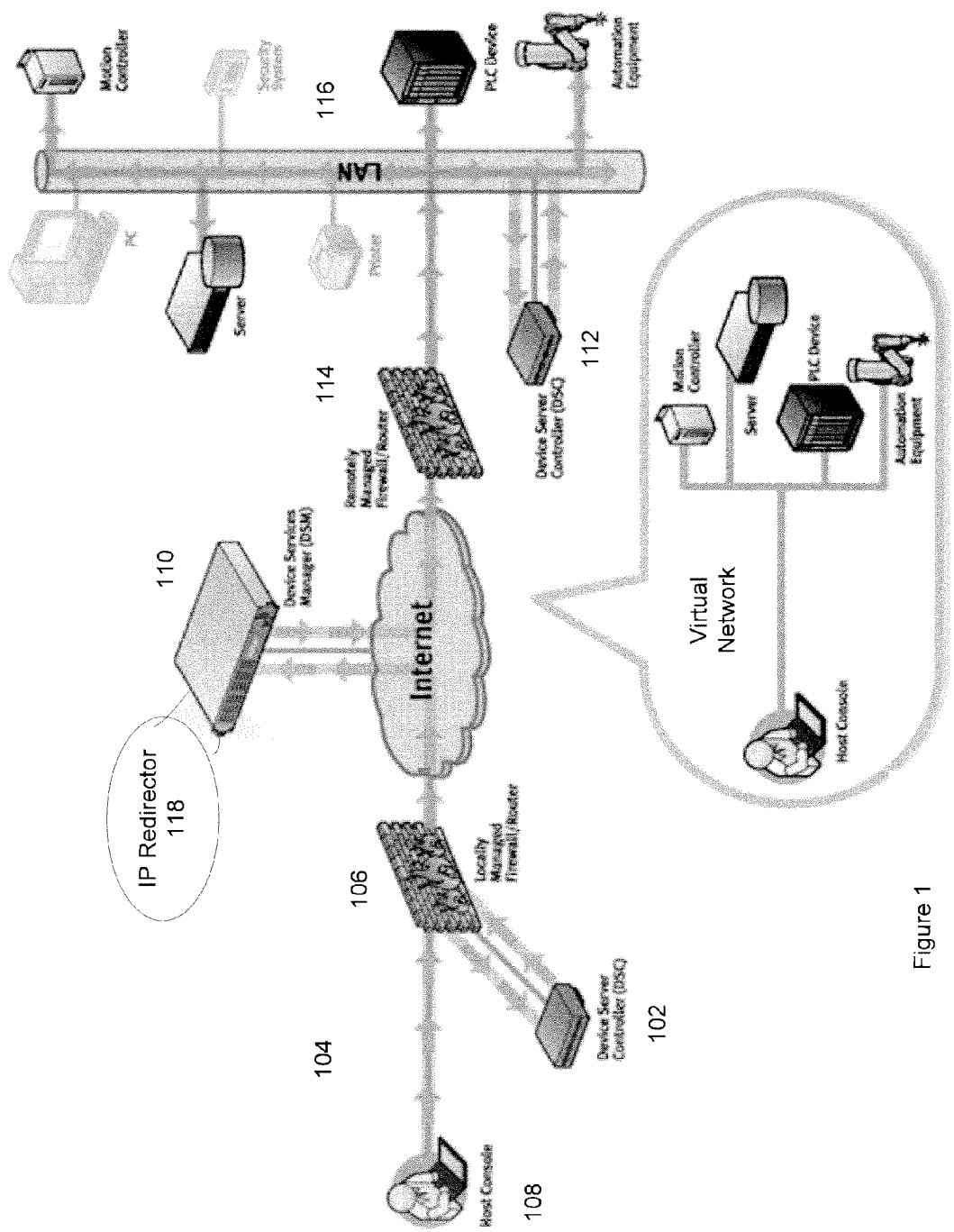
FIG. 1 illustrates a block diagram of an embodiment of a system to access to and from networked devices in networks protected by firewalls.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, networks, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first network, may be made. However, the specific numeric reference should not be interpreted as a literal sequential order but rather interpreted that the first network is different than a second network. Thus, the specific details set forth are merely exemplary. The specific details may be varied from and still be contemplated to be within the spirit and scope of the present invention.

In general, the various methods and apparatus are described to provide a central system to allocate and assign virtual IP addresses to two or more remote devices. A device service manager server (DSM) may have a network access module configured to establish communications with two or more device service controllers (DSCs). The DSM serves as a central management station for allocating and assigning Virtual IP addresses to network devices to proxy communications for networked devices on a local area network (LAN) where each DSC resides. The DSM is located exterior from the network devices on the LAN where communications associated with the assigned VIP addresses are being routed to. The DSM instructs each DSC to obtain available local virtual IP addresses in the local area network in which that DSC resides. The DSC then reports those available local virtual IP addresses back to the DSM. The DSM assigns a virtual IP Address to given DSC and establishes a route from the virtual IP address assigned to the first DSC to a destination network device, based on corresponding DSC and network device information stored in a registry of the DSM.

The network access module in the DSM may be configured to create a example pairings of 1) each DSC's unique identifier and the virtual IP address of the local network assigned with the DSC, 2) a unique identifier of a host DSC controller and a real IP address of a host console network device associated with the unique identifier of DSC on a first local area network, as well as a pairing of 3) a real IP address of a destination network device and a unique identifier of a destination DSC on a second local area network. The DSM stores these pairings in the registry of the DSM.

FIG. 1 illustrates a block diagram of an embodiment of a system to access to and from networked devices in networks protected by firewalls.

A first device service controller 102 (DSC) in a first network 104 protected by a first firewall 106. The first network 104 may contain a host console 108 associated with the first DSC 102. The host console 108 controls and manages a subset of equipment in a second network 116 protected by a second firewall 114. The second network 116 is located over the Internet from the first network 104 and the host controller 108. The first device service controller 102 in the first network 104 and a second device service controller 112 in a second network 116 cooperate with a device service manager server (DSM) 110 located on the Internet to provide highly secure remote access to the subset of equipment in the second network 116 through the firewalls 106, 114. The device service manager server 110 has an IP redirector program 118 containing code to perform machine-to-machine communications, via a direct communication tunnel, with each device service controller through the firewalls 106, 114. The subset of equipment in the second network 116 may for example, include a server, a PLC device, a motion controller, automation equipment, a printer, a security system and a personal computer.

In operation, the user from the host console 108 opens a connection to a designated port on a local DSC, i.e. the first DSC 102, operating in Host Controller Mode. This local DSC will accept the connection and hold the connection pending the establishment of a connection through to the target device. This local DSC will then initiate a connection to the controlling DSM 110, which will map the connection to a corresponding managed device IP address and port. The local DSC sends its identification information to successfully authenticate itself to the DSM 110. The associated DSC responsible for the target device, i.e. the second DSC 112, will periodically open a secure tunnel with the DSM 110 and determine if there is a pending connection. If there is a pending connection, the DSM 110 will instruct the DSC to initiate a proxy connection to the DSM 110, through which it will pass the traffic for the pending connection. The local DSC behind the firewall holds the direct communication tunnel with the DSM 110 open if there is a pending connection.

The direct communication tunnel between the first DSC 102 and the DSM 110 as well as the direct communication tunnel between the second DSC 112 and DSM 110 combine to allow secure access and management of equipment in a network protected by a firewall from a device external to the network protected by the firewall while maintaining a network's IT policy and the integrity of the network's firewall. The connection points to the first DSC 102 and the second DSC 112 are not publicly exposed outside their respective networks to devices external to their networks because the DSCs 102, 112 are located behind their respective firewall 106, 114 to increase security of the communications through the direct communication tunnel. When the local DSC successfully authenticates to the DSM 110, the DSC can immediately begin providing secure access to any device such as the PLC device, in the network that has been designated as visible to a participating DSC. The designated visible devices have been authorized by the user of the second network 116 to be published.

As discussed, visible associated devices have been authorized by the owner of that domain to be visible/published to the virtual device network VDN (i.e. the VDN includes the equipment in the first and second networks 104, 116 that have been authorized to be visible). The example subset of equipment in the second network authorized to have their information visibly published to the VDN include a server, a PLC device, a motion controller, and the automation equipment, while the printer, a security system and a personal computer have not been authorized by the user to be visible to the VDN.

The local DSC discovers the components within its network and presents the owner of that domain with a graphic user interface asking which network components the owner wishes to make visible/publish their information. The local DSC collects this information, stores this information, and sends the publish information of its network devices on that LAN to the DSM. The information can include the DSC's identifier and IP address, and each component's IP address, name, capabilities, protocols supported, etc, within that DSC's network.

Figure 6:
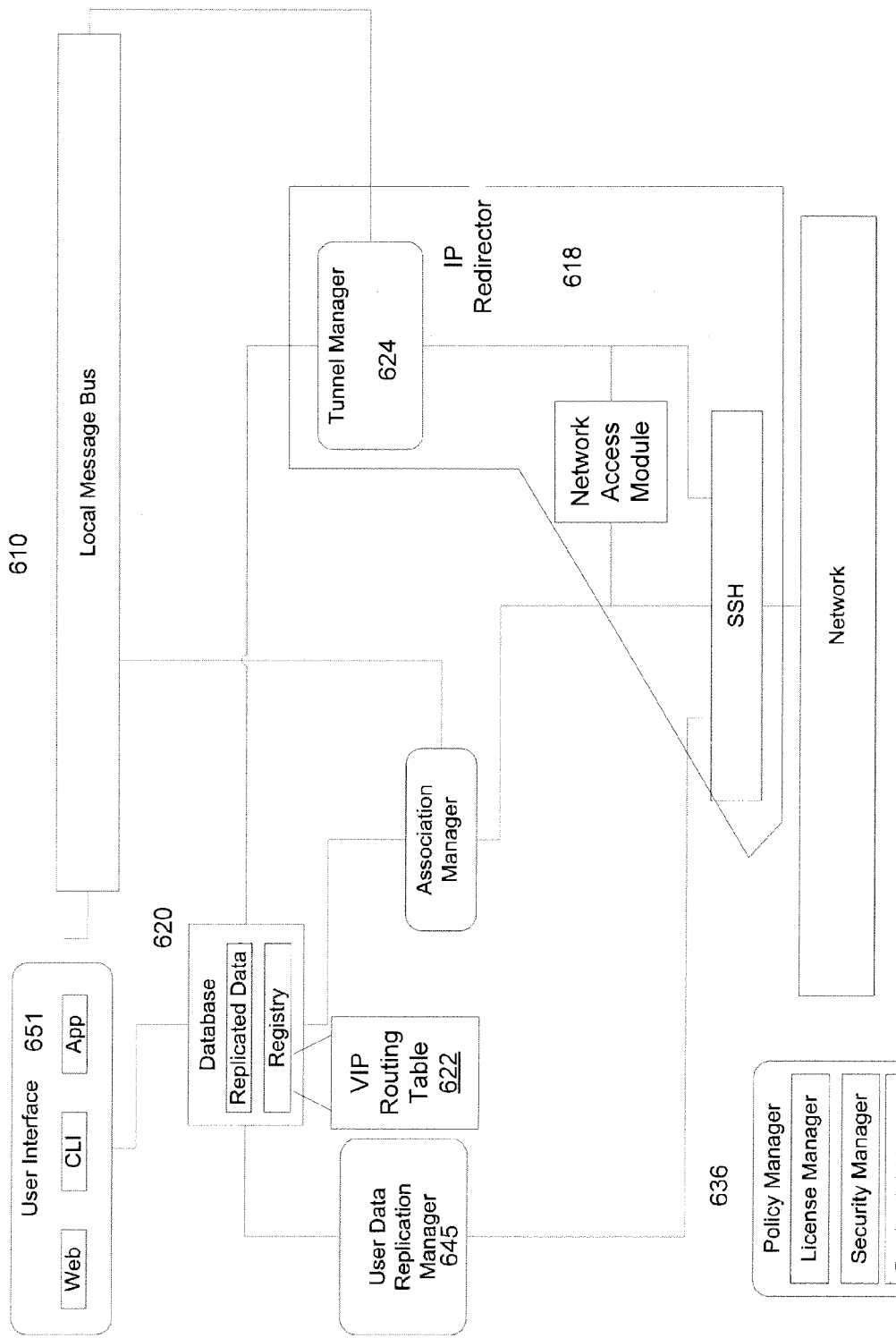
FIG. 6 illustrates a block diagram of an example embodiment of a DSM.

FIG. 6 illustrates a block diagram of an example embodiment of a DSM. The DSM 110 may contain components such as an IP redirector 618 that includes a Tunnel Manager in the DSM 610, a user interface, a database 620 that includes a registry, an association manager, a policy manager, a replication manager, and other similar components.

Figure 7:
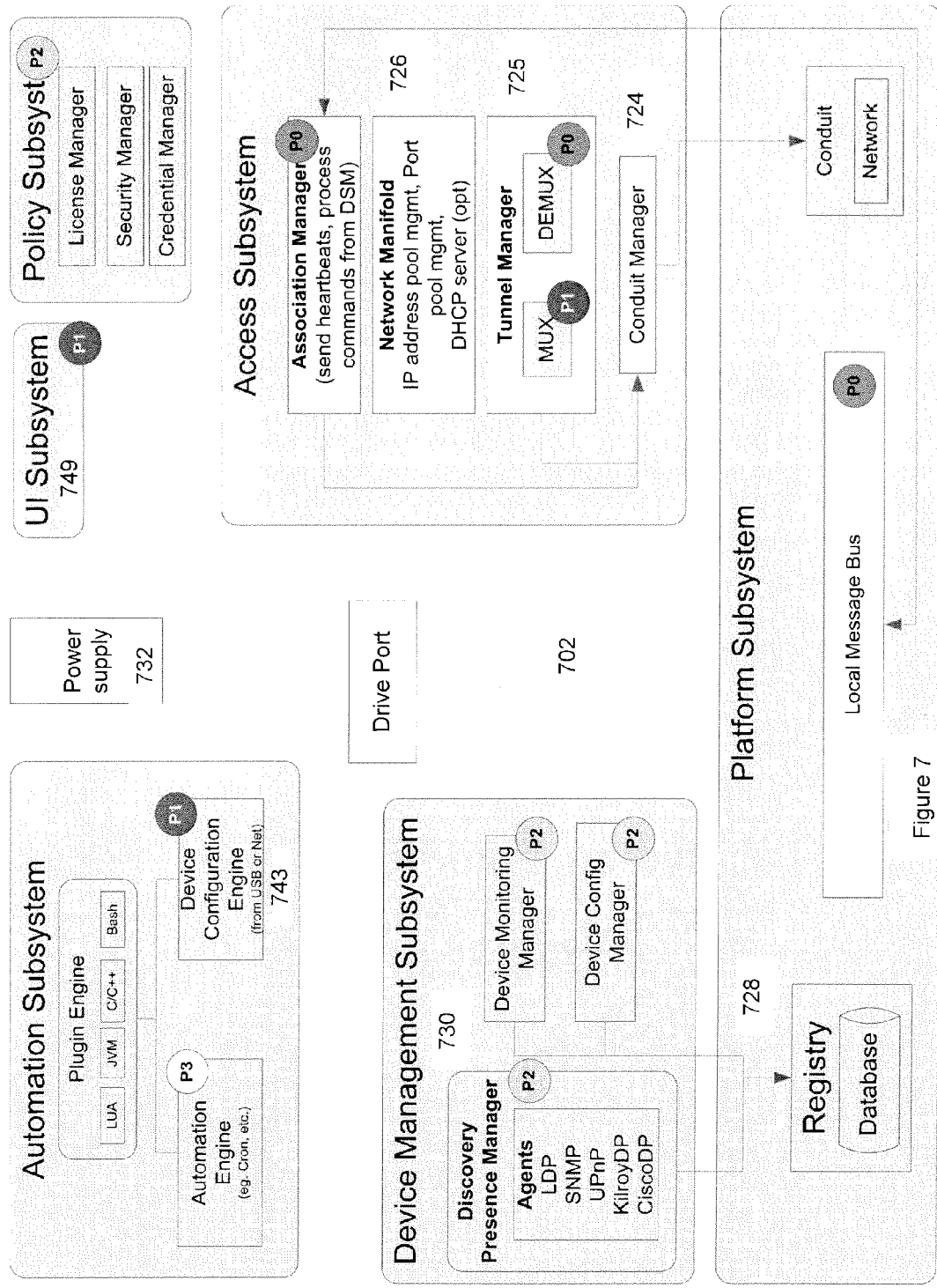
FIG. 7 illustrates a block diagram of an example embodiment of a DSC.

FIG. 7 illustrates a block diagram of an example embodiment of a DSC. The DSC 702 may contain components such as an Access Subsystem that includes the following components: an Association Manager; Conduit manager 724; a tunnel manager; and a network manifold 726. The DSC may also include a local database 728 that includes a registry, a Discovery manager 730, device configuration manager, a device monitoring manager, an automation sub system including a device configuration engine 743, a user interface, a power supply 732, a drive port 734, and other similar components.

Figure 9:
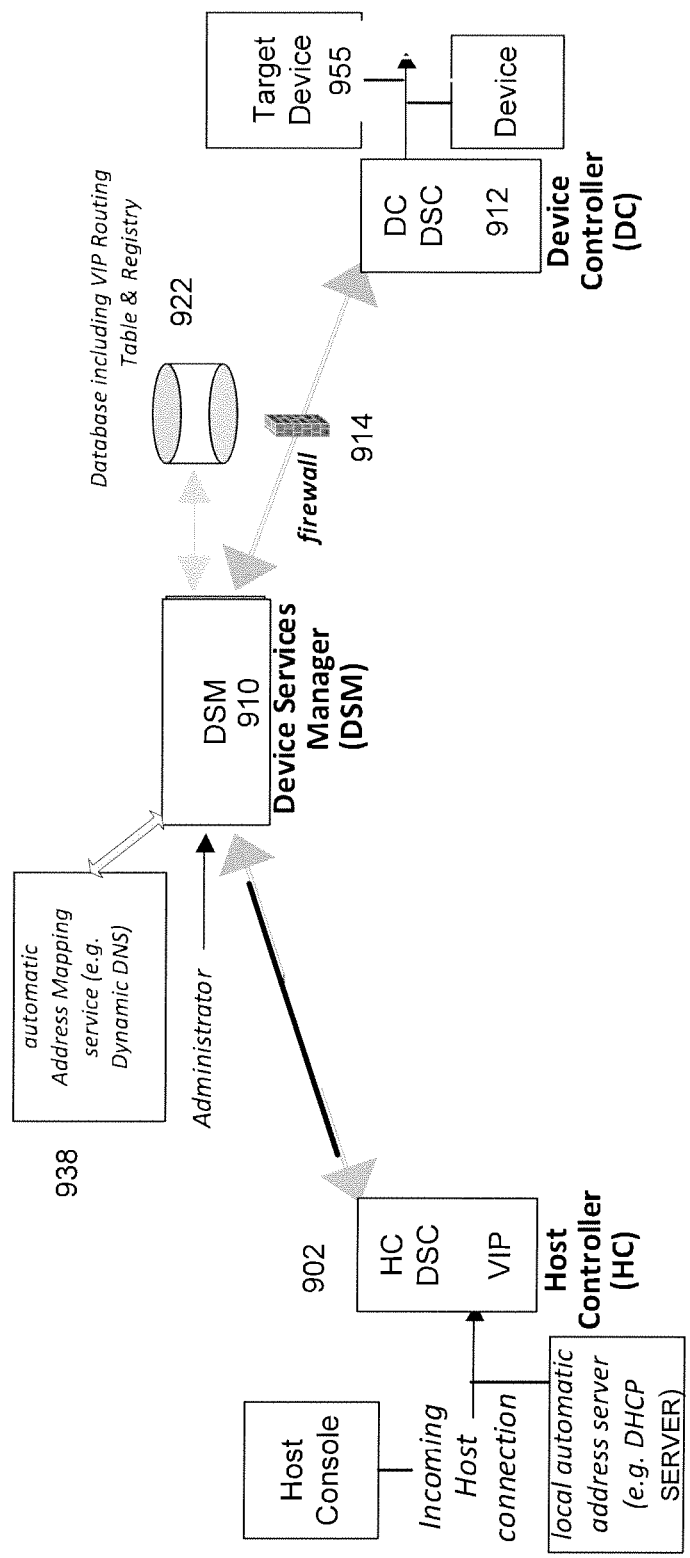
FIG. 9 illustrates a block diagram of an embodiment of an DSM that automates the allocation of Virtual IP addresses.

FIG. 9 illustrates a block diagram of an embodiment of a DSM that automates the allocation of Virtual IP addresses. The DSM 910 has a network access module, that includes a network access manager and a tunnel manager, configured to cooperate with two or more device service controllers (DSCs) and serve as a central management station for allocating and assigning Virtual IP addresses to network devices to proxy communications for the networked devices on a local area network where each DSC resides 902,912. The DSM 910 is located exterior from the network devices on the LAN where the communications associated with the VIP addresses are being routed to. Thus, the DSM 910 automates the configuration and allocation of these virtual IP addresses from the central DSM 910, so the user does not need to do anything at the host end to make them work. The DSM 910 assigns a Virtual IP Addresses to a given DSC and establishes a route from the assigned Virtual IP address to a destination network device, based on corresponding DSC and network device information stored in DSM's registry 922. The networked devices may be located behind a firewall, such as a local firewall 914, on a local area network relative to a location of the DSM 910 on the wide area network.

On DSM 910, the VDN administrator may manually specify a virtual IP address pair (i.e. Host Controller DSC ID and Local Virtual IP address assigned) and route to destination device (i.e. corresponding Device Controller DSC ID and Local Virtual IP address assigned pair). Alternatively, the DSC may find out what virtual IP addresses are available in its local network and then report those IP addresses to the DSM 910. The network access module in the DSM 910 creates a pairing of 1) each DSC's unique identifier (ID) and the virtual IP address of the local network associated with the DSC. The network access module in the DSM 910 also creates a pairing of 2) the unique identifier of host DSC controller and the real IP address of the host console network device associated with the unique identifier of DSC on the first local area network, as well as a pairing of 3) the real IP address of the destination network device and the unique identifier of the destination DSC on the second local area network. The network access module in the DSM 910 then stores these pairings in the VIP routing table in the DSM 910 in the DSM's registry 922. The pairing could also be a pairing a virtual IP address of the local network to the unique identifier of the DSC for that local network, other pairings of network devices on the local networks and a virtual IP address associated with that local network are also possible. This routing information is added on top of the existing packet routing information, in the header portion of the packet.

The DSM 910 may integrate with an automatic address mapping service, such as a Domain Name System 938, since applications do not need to change their target ports or be configured to use a different port. All an administrator needs to do is set up a domain name pointing to the virtual IP address (VIP) and the user application remains completely unchanged.

The VIP Routing Table 922 may further store the VIP addresses, the VIP address to unique ID pairings, routes to devices, and similar information. The virtual IP address Routing Table 922 may also store at least 1) the real IP addresses of each DSC and the network devices on the local area network designated as visible by a user of the local area network, which are registered with the DSC, 2) the Virtual IP addresses of the DSC and the network devices registered with the DSC, 3) connection routes to devices, 4) all published information of the DSCs and their associated visible network components, 5) connection end points, current connections, host information, and similar information. The virtual IP address Routing Table 922 makes up part of the Registry in the DSM 910. With this stored information, the DSM-DSC system then can map a virtual IP address assigned by the DSM 910 to real IP address associated with or behind each DSC to establish the route between an initiating network device and a destination device. Overall, the DSM 910 automates the mapping from a Virtual IP address to a real IP address, whether or not that the real addresses may or may not be NAT'ed. Note, DSC devices are configured to register both themselves and any associated network devices with the DSM Registry 922 and periodically update that information. Also, the local DSC 912 receives the traffic from the DSM 910 and then actually routes the traffic to the real IP address associated of the destination target device such as a first network device 953.

The DSC's unique identifier for pairing purposes in the DSM 910 may be the unique ID hard coded into each DSC, the MAC address assigned to that DSC, or the real IP address assigned to that DSC. However, the MAC address or real IP address assigned to that DSC can possibly change in the future and thus require more administration than the unique ID.

The network access module of the DSM 910 has code scripted to instruct the host DSC Controller 902 to find out what virtual IP addresses are available in its local network and then report those VIP addresses to an association manager in the DSM 910. The DSC 902 can obtain the VIP addresses using a local automatic address server 940 (e.g. DHCP), and then copies the VIP addresses back to the association manager in the DSM 910.

Figure 10:
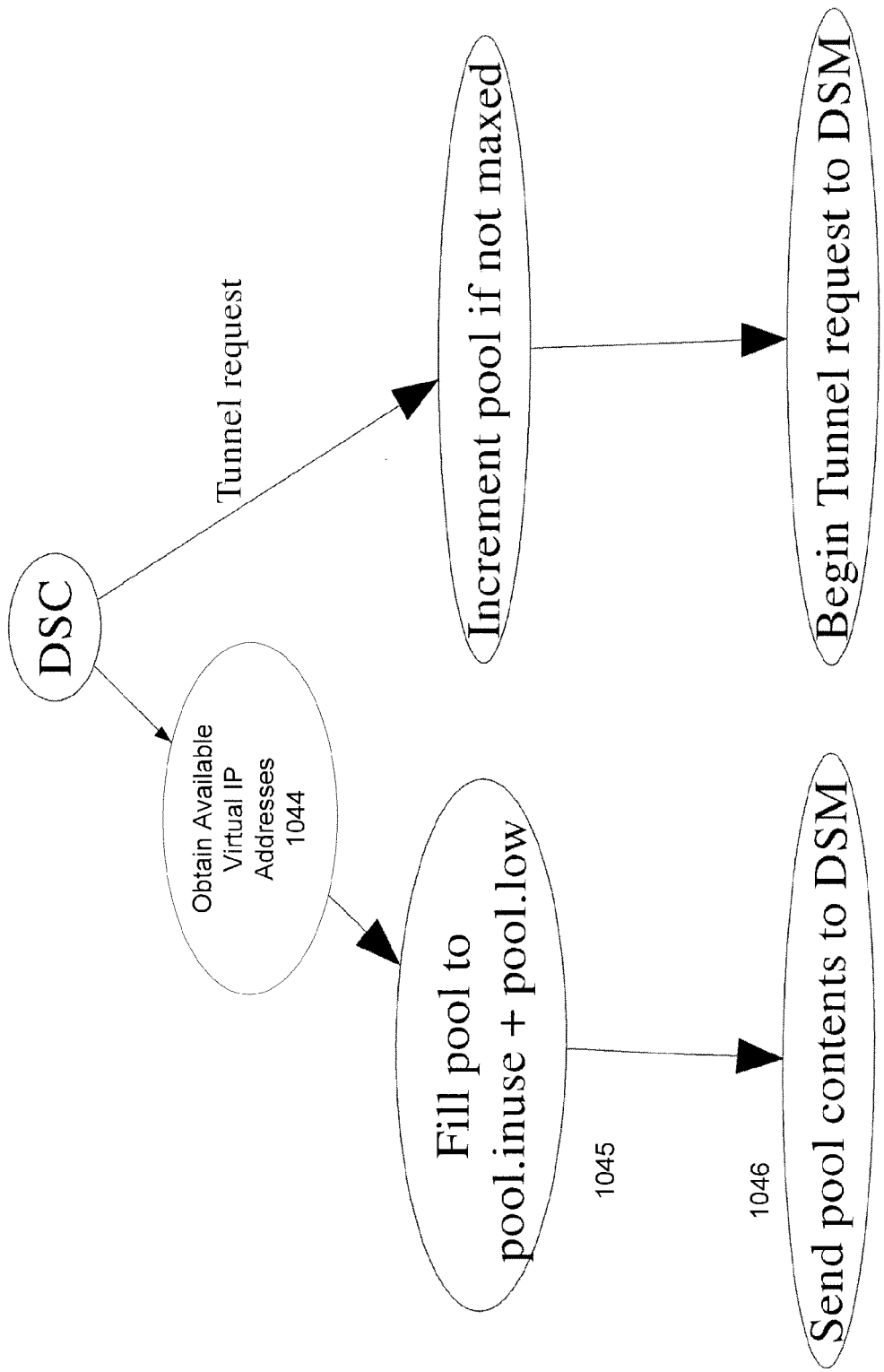
FIG. 10 illustrates a flow diagram of an embodiment of a network manifold obtaining and reporting Virtual IP addresses to the DSM.

FIG. 10 illustrates a flow diagram of an embodiment of a network manifold in a DSC obtaining and reporting virtual IP addresses to the DSM.

Referring to FIGS. 9 and 10, in operation in block 1044, the DSM automatically instructs the network manifold of the Host DSC Controller 902 to obtain a local VIP address, e.g. using DHCP, when the DSC initially communicates with the DSM and then periodically as follows. The network manifold of the DSC 902 then uses the local automatic address server 940 to pick up a VIP address on 1) an each connection occurrence basis or, 2) for efficiency in block 1045, picks up VIP addresses from a pool of VIP address pre-identified as available VIPs in this local LAN by DSC 902 to DSM 910. In block 1046, the network manifold of the DSC can obtain the VIP addresses using a local automatic address server 940 (e.g. DHCP), and then copies the VIP addresses back to DSM 910. The DSM 910 automates the configuration of these virtual IP addresses from the central DSM 910, so the user does not need to do anything at the host end to make them work. The network access module then updates routing information in the VIP Routing Table 922 to be able to correlate/map real IP addresses with assigned VIP addresses and store that association in the DSM registry 922 as well as in potentially a domain name server 938 to associate a domain name to VIP address.

In an embodiment, the association is stored permanently in the VIP Routing Table 922. In an embodiment, the association pairing is held temporarily stored in the VIP Routing Table 922 while the connection is active and then placed in a queue of stored pairs, such as 100 stored pairs, until replaced by new active connection needing a pairing and is overwritten on a least frequently used basis.

As discussed, the Host DSC 902 may query the DSM 910, or even directly query the DNS 938. The Host DSC 902 may query the DNS 938 for the correct Virtual IP address, or obtain this by querying the VIP Routing Table 922. The Host DSC 902 connects to the new VIP address assigned to DSC. Upon receiving a query, the network access manager in the DSM 910 may establish a route from a domain name to a remote target device via address the automatic mapping service 938 (i.e. Dynamic DNS). The automatic mapping server 938 sets up a domain name pointing to the virtual IP address and maps the traffic from the originating network device (i.e. Host Controller DSC ID and Local Virtual IP address assigned pair) to the destination device (i.e. corresponding Device Controller DSC ID and Local Virtual IP address assigned pair). Thus, the DSM 910 maps the specified pairing of the Virtual IP address assigned to first DSC 902 and its unique ID to the pairing of the IP address assigned to a second DSC 912 and its unique associated with the domain name. The network access manager in the DSM 910 cooperates with a domain name server to optionally update one or more address records in the DNS 938 to allow automatic domain name-to-IP address resolution. In an embodiment, a domain name may be an alpha numeric name that is mapped to a numeric IP addresses in order to identify a computing device on the Internet. Thus, the originating network device may merely type in a domain name for traffic headed to a destination device.

The DNS 938 is connected and operated by the DSM 910 and may create a virtual IP address for each active connection. Rather than forwarding individual ports from multiple devices to a single public IP address, the network access module in the DSM 910 cooperating with the network manifold in each DSC 902, 912 sets up a virtual IP address for each link, and each DSC, and can thus handle TCP/IP connections to any arbitrary port on any target device. This solution can be easily integrated into the Domain Name System, since applications do not need to change their target ports or be reconfigured to use a different port. All you need do is set up a domain name pointing to the virtual IP address and the user application remains completely unchanged.

Operationally, the DNS Server 938 merely needs to allocate a virtual IP address when a DNS query occurs. Each DSC 902 912 pre-allocates a pool of VIP addresses available in its LAN, then sends this pool of VIP addresses to the DSM 910. The DSM 910 is then free to assign and use VIP address entries from the pool as needed. The only information the DSC needs is whether to allocate or reclaim VIPs from the pool.

In order to prevent obvious DoS attacks, the DSM 910 maintains two pools for assigning Virtual IP addresses. A smaller pool of VIP addresses is used for requests from unknown public IP addresses and a larger pool of VIP addresses is used for requests from known IP addresses registered with the DSC. Once a connection is established, the public IP from which that connection arrives is placed in an automatic white-list pool, which is then allowed to have longer timeouts.

The entries in the white-list may also have exponential decay timers to automatically remove them from the white-list pool after the connection terminates.

FIG. 11 illustrates a diagram of a DSM creating two or more pools of virtual IP address available in the local network.

Referring to FIG. 11, in operation in block 1150, the network access module in the DSM, on a DNS query, checks to see if a virtual IP address is assigned to the hosting DSC.

If yes, a virtual IP address is currently assigned to the hosting DSC, the network access module sends the virtual IP address to the hosting DSC.

If no, a virtual IP address is not currently assigned to the hosting DSC, in block 1154, the network access module checks whether the query comes from a public IP address or the query is from a DNS query whitelist.

If yes, the query does comes from a registered public IP address or from the whitelist, then the network access module assigns a virtual IP address from the large pool of available Virtual IP addresses available for the host DSC.

If no, the query does not comes from a known public IP address or from the whitelist, then the network access module assigns a virtual IP address from the small pool of available Virtual IP addresses available for the host DSC.

Now the virtual IP address is assigned to the hosting DSC.

In block 1156, the network access module of the DSM sends virtual IP address in response to the query.

Referring to FIG. 9, the network manifold in the DSM 910 on a tunnel request from a DSC adds the public IP address of the request to a white list and then sends to tunnel dispatcher.

Note that there is no requirement for network administrator intervention on the intervening firewall or NAT device, nor any requirement for any configuration changes to the host device to use this mode, but the network administrator should create a sub domain for the desired DNS domain (i.e. local network) and either delegate that sub domain to the DSM 910 or allow the DSM 910 to provide dynamic DNS updates.

Referring to FIG. 7, as discussed each DSC 702 has a network manifold 726 configured to manage and maintain the one or more pools of IP addresses via DHCP, port management, and a DHCP server. The Network manifold 726 in the DSC 702 may consist of the following components: a DHCP Server, a Virtual IP Pool Manager, to maintain the collection of Virtual IP addresses, and a Port Pool Manager to maintains a pool of ports.

The network manifold 726 in the DSC 702 is responsible for maintaining a pool of Virtual IP addresses for use by the DSM 910 when mapping an IP address to a domain name.

The Network manifold 726 in the DSC 702 keeps several values for its operation:

pool.max specifies the maximum number of IP addresses the DSC 702 will reserve at one time (excluding itself);

pool.lowmark specifies the number of IP addresses to always keep in reserve (unless pool.max is reached); and pool.inuse the number of IP addresses currently in-use.

The Network manifold 726 in the DSC 702 communicates with the network access module in the DSM to gain the pool. in use amount. In addition, the Network manifold 726 in the DSC 702 should be able to query the DSM for the usage of each in-use IP address for expiration purposes.

The DSC 702 needs no additional knowledge of the destination. In fact, the DSC 702 has no knowledge of the final destination of the tunnel.

The tunnel manager 725 in the DSC 702 communicates with the network manifold 726 as well as other internal processes both in multiplexer (MUX) and DeMUX mode and directs tunnel traffic. The MUX mode allows associated network devices to a DSC communicate with associated network devices of another DSC in other domains. The DEMUX mode redirects tunneled traffic from the DSM to associated network devices in the local domain. Mux mode may have two associated programs. The Port MUX tunnels local ports (tcp/udp) to the DSM 910. The Virtual IP MUX tunnels traffic to virtual IP addresses to the DSM 910.

The Tunnel MUX manager 725 accepts connections (TCP/UDP) on a DSC from the local LAN. By using Netfilter/IPTables, all virtual interfaces on a DSC can be redirected to a single Tunnel MUX manager daemon.

The MUX Manager can then query the Netfilter interface for the intended destination to determine the Virtual IP. Upon connection to the DSM Tunnel Manager, the MUX Manager can send the Virtual Destination IP, Virtual Destination Port number, and DNA ID of the local DSC.

Based on this information, the DSM can determine where the packet is actually intended to and then proxy the connection.

The MUX TCP Tunnel Handler sends some initial header information to the DSM. It then performs a similar function to tcp_relay3.

The Tunnel DEMUX Manager's task is very simple. Upon receiving a connection and doing some authentication, it reads an initial header to determine the packet type and destination. The Tunnel DEMUX Manager then spawns either the tcp_relay agent or the udp_relay agent to perform the actual relay task.

In this way, the DSM 910 serves as the proxy access point for multiple associated devices of each DSC operating behind corporate firewalls and customer NAT routers.

Referring to FIG. 6, a graphic user interface 651 of the DSM 610 is also configured for the DSM administrator to specify individual device associations, which are defined as a pairing of an existing device configuration with a specific discovered DSC device. Once a device has been associated in the DSM's registry 620, the DSM 610 may apply appropriate configuration changes and shall begin forwarding proxy connections to the DSC for network equipment as per a preset set of Access Rules maintained in the IP redirector module 618 in the DSM 610.

As detected DSCs are found and registered, an appropriate icon may appear in the Device Monitoring Service view of the graphic user interface 651. The user may then associate each such registered device with a previously created configured record. Once that is done, additional device settings (including Discovery search records) can be automatically downloaded to the DSC device. Based upon these settings, the DSC will then begin discovering additional network devices and passing traffic.

The User Data Replication Manager 645 in the DSM 610 provides a mechanism for data to be replicated from a DSC to a DSM. The User Data Replication Manager 645 in the DSM 610 generates a local copy of the device configuration file including the configuration record for that DSC. The DSC uses the secured communications channel implemented in SSH to fetch the local copy of the device configuration file from the central registry 620, and then the DSC updates its locally stored copy of the device configuration file. Thus, a shadow configuration registry is maintained on the remotely managed DSC device. The DSC then signals to DSM 610 that the update is complete and the DSM 610 updates the DSC's status of remote configuration in the Central Registry 620 of the DSM 610.

Figure 2A:
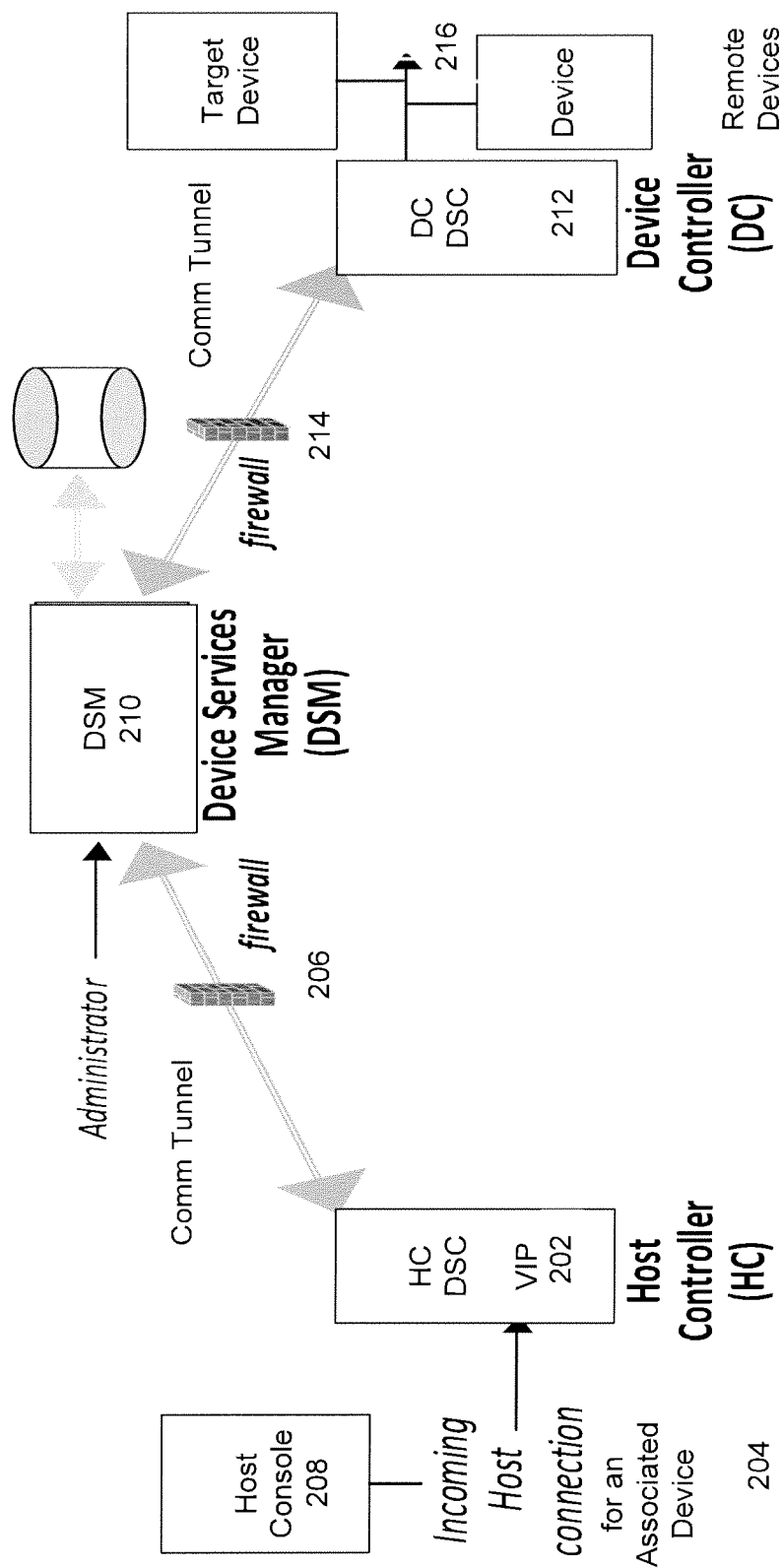
FIG. 2a illustrates a block diagram of an embodiment of system having a device service manager server located exterior to a first domain protected by a first firewall and a second domain protected by a second firewall.
Figure 2:
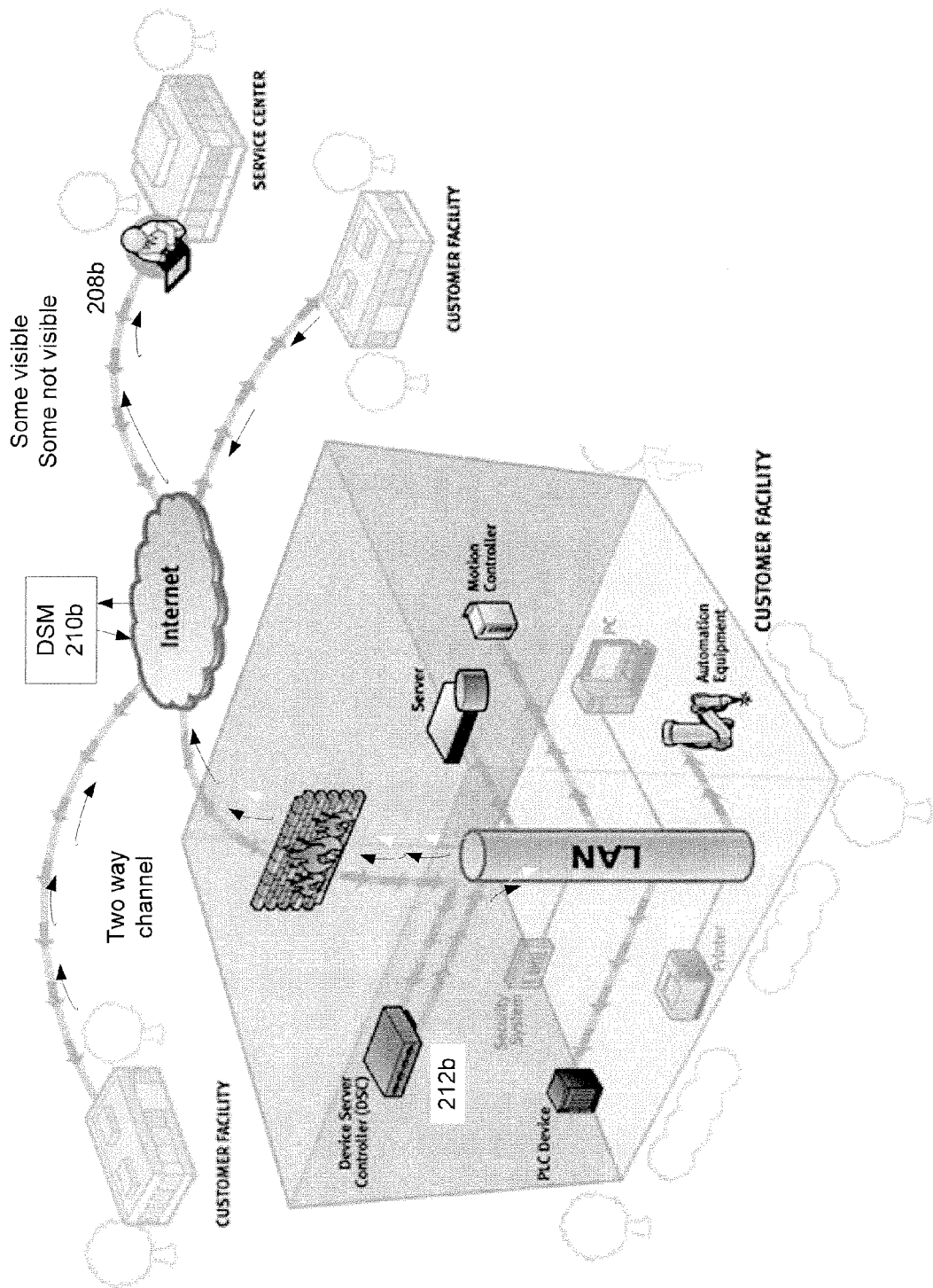
FIG. 2b illustrates a block diagram of an embodiment of a system with DSCs each having a conduit manager configured to provide a direct communication tunnel to the DSM by authenticating itself to the DSM and establishing an outgoing TCP/IP stream connection to the DSM and then keeping that connection open for future hi-directional communication on the established TCP/IP stream connection.

FIG. 2a illustrates a block diagram of an embodiment of system having a device service manager server located exterior to a first domain protected by a first firewall and a second domain protected by a second firewall.

Each DSC 202, 212, is configured with hardware logic and software to act as both 1) a Host Controller (which establishes connections for both itself and its associated devices in the first domain 204 to the DSM 210 located beyond the first firewall 206 and 2) a Device Controller (which receives and manages incoming connections from the DSM 110 to individual remote target devices in the second domain 216 protected by the second firewall 214. Note, a domain may be any network separated by a firewall or different subnets. The DSC will be able to proxy connections for both itself and its associated devices to its parent DSM located beyond the local domain. Each DSC may be configured to periodically send an outbound communication to check with the DSM to see if any pending TCP connections are waiting.

In an embodiment, the first DSC 202 and the second DSC, 212 have a Conduit Manager to provide the direct network communication tunnel to the DSM 210 by authenticating itself to the DSM 210 and establishing an outgoing TCP/IP stream connection to the DSM 210. The DSC keeps that connection open for future bi-directional communication on the outgoing TCP/IP stream connection. The established and authenticated, bi-directional communication, TCP/IP stream connection may be known as a direct network communication tunnel or conduit tunnel. The IP redirector of the DSM 210 sends routed packets down a first established TCP/IP stream connection to the first DSC 202 and sends routed packets down a second established TCP/IP stream connection to the second DSC 212. The IP redirector of the DSM 210 routes packets for a network component in the first domain 204 behind the first firewall 206 down the first established TCP/IP stream connection to the first DSC 202. The IP redirector of the DSM 210 also routes packets for a network component in the second domain 216 behind the second firewall 214 down a second established TCP/IP stream connection to the second DSC 212. Note, because TCP/IP is a bi-directional stream protocol, the DSM 210 can send routed packets down the open communication conduit tunnel and receive traffic from each DSC 202, 212.

The host console 208 and the subset of equipment in the second network form part of the VDN in which the host console 208 controls and manages the subset in second network by the second DSC 212 traversing outbound through a local firewall and/or a customer's NAT routers to access the subset of equipment on the remote network. The host console 208 establishes a single out-bound connection to the DSM 210 controlling the VDN, which allows two-way communications, and then holds that out-bound connection open. The VDN via the DSCs cooperating with the DSM 210 may create dedicated TCP/IP connections between any two points on the Internet.

FIG. 2b illustrates a block diagram of an embodiment of a system with DSCs each having a conduit manager configured to provide a direct communication tunnel to the DSM by authenticating itself to the DSM and establishing an outgoing TCP/IP stream connection to the DSM and then keeping that connection open for future bi-directional communication on the established TCP/IP stream connection. A host console 208b connects to a remote DSC 212b via a local DSC and the DSM 210b. The local and the remote DSC 212b can both hold open a direct communication tunnel between themselves and the DSM 210b for bi-directional communications. The direct TCP communication tunnel is a two-way TCP/IP stream connection/TCP session that is held opened to the DSM 210b. The traffic on the incoming connection is then relayed through that session. The Conduit Manager in the remote DSC 212b may use a certificate-based SSH (Secure Shell) encryption protocol to ensure secure, end-to-end communication between the host console 208b and the destination target device, such as a Motion Controller, via the direct TCP communication tunnel. After the traffic has been communicated, then the TCP session may then be closed. Thus, the direct TCP communication tunnel may be implemented via SSH.

In an embodiment, the direct TCP communication tunnel can also be a simple TCP port forwarder. The program is just listening to a local TCP port and all the received data will get sent to a remote host, the DSM. The direct TCP communication tunnel allows the user to bypass a firewall that does not allow a remote device to make inbound TCP/IP connections to your server.

The remote DSC is also de-multiplexing the traffic from the direct communication tunnel to the network components on its associated local area network by decoding the header on the traffic and forwarding that traffic onto the target network component. The TCP packet header information in general identifies both the source port originally sending the data and the target destination port receiving the packet.

Figure 5:
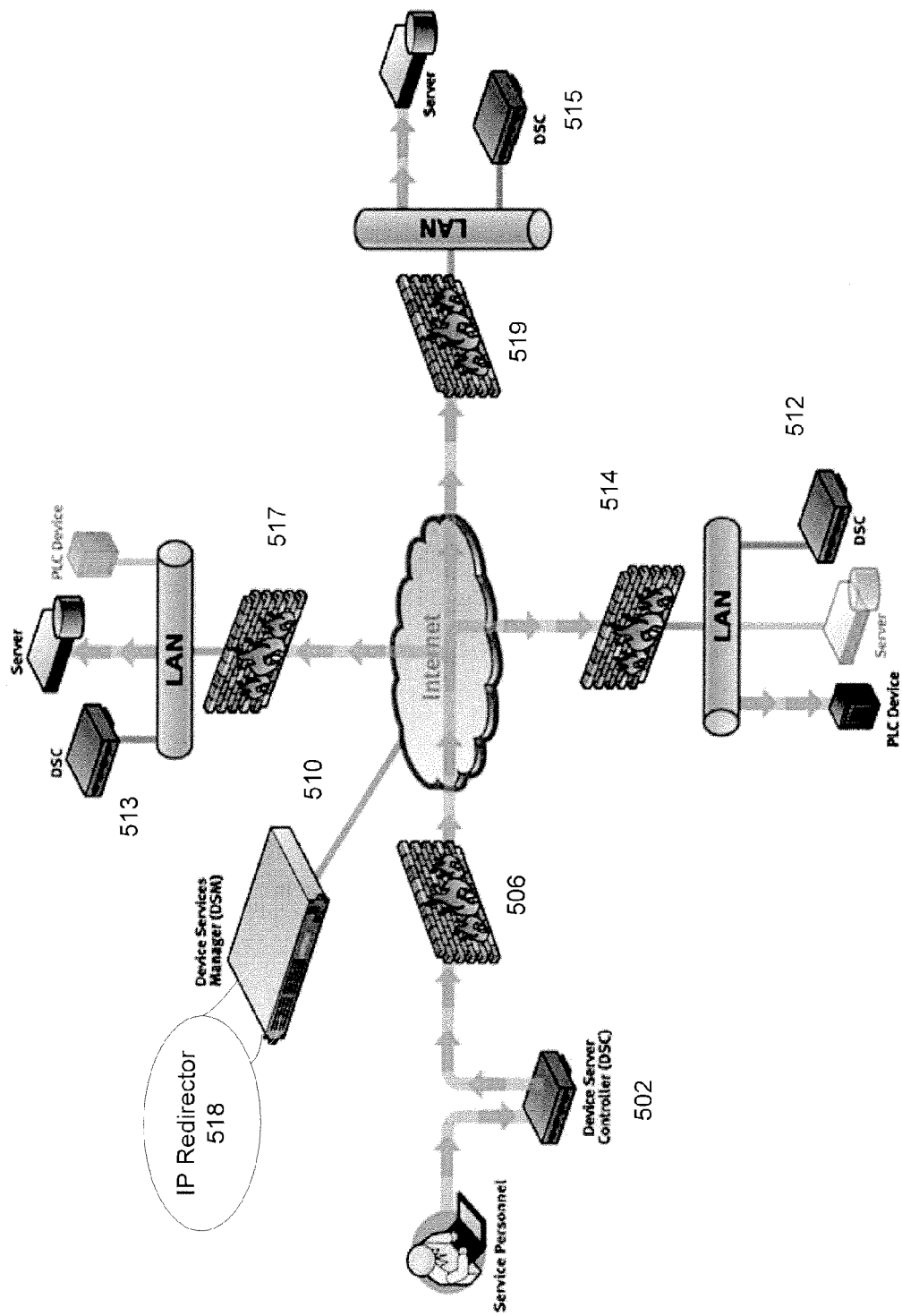
FIG. 5 illustrates a block diagram of an embodiment of an automated centralized administration of a distributed system.

FIG. 5 illustrates a block diagram of an embodiment of an automated centralized administration of a distributed system.

The heart of the system is the DSM 510. The Device Services Manager manages a collection of DSCs 502, 512, 513, and 515. The DSM 510 may have an IP redirector module 518 configured to cooperate with the two or more DSCs 502, 512,513,515 that are behind a firewall, such as firewalls 506, 514, 517, and 519, on a wide area network relative to a location of the DSM 510 on the wide area network. The DSM 510 serves as a central management station for automatic distribution of configuration information to the DSCs 502, 512, 513, and 515. An executable boot up file uploaded via a drive port in that DSC is scripted to gather configuration information for that DSC and network devices on the same network as that DSC and without a prompt by the DSM 510 then sends an initial configuration file to the DSM 510. The DSM 510 makes a master copy of the device configuration file in the DSM's registry for that DSC.

Each DSC 502, 512, 513, 515 and the DSM 510 work in concert to provide end-to-end access between associated devices in different Domains. The DSM 510 serves as a proxy connection point for participating DSCs 502, 512, 513, 515. The DSM 110 is a dedicated appliance that relays connections between user hosts and destination devices.

Individual DSC 502, 512, 513, 515 serve as a low cost point of presence on participating LANs. Each DSC 502, 512, 513, 515 is capable of acting simultaneously as both a Host Controller (which originates connections from host systems) and a Device Controller (which receives and manages incoming connections to individual remote devices). Each DSC 502, 512, 513,515 is configured to proxy connections for both itself and its associated network devices to its parent DSM 510 located beyond the local LAN.

To the remote network, a newly installed DSC functions like a newly installed computer. To access devices on a remote network, the DSC just needs to establish a single out-bound connection to the DSM controlling the VDN. The outbound connection is a conduit communication link between the DSC acting as a Host Controller and the DSM. Once this connection is established, all system configuration, commands and network traffic can pass through the encrypted channel. When the DSC successfully authenticates to the DSM, it can immediately begin providing secure access to individual pieces of pre-authorized equipment.

Figure 8:
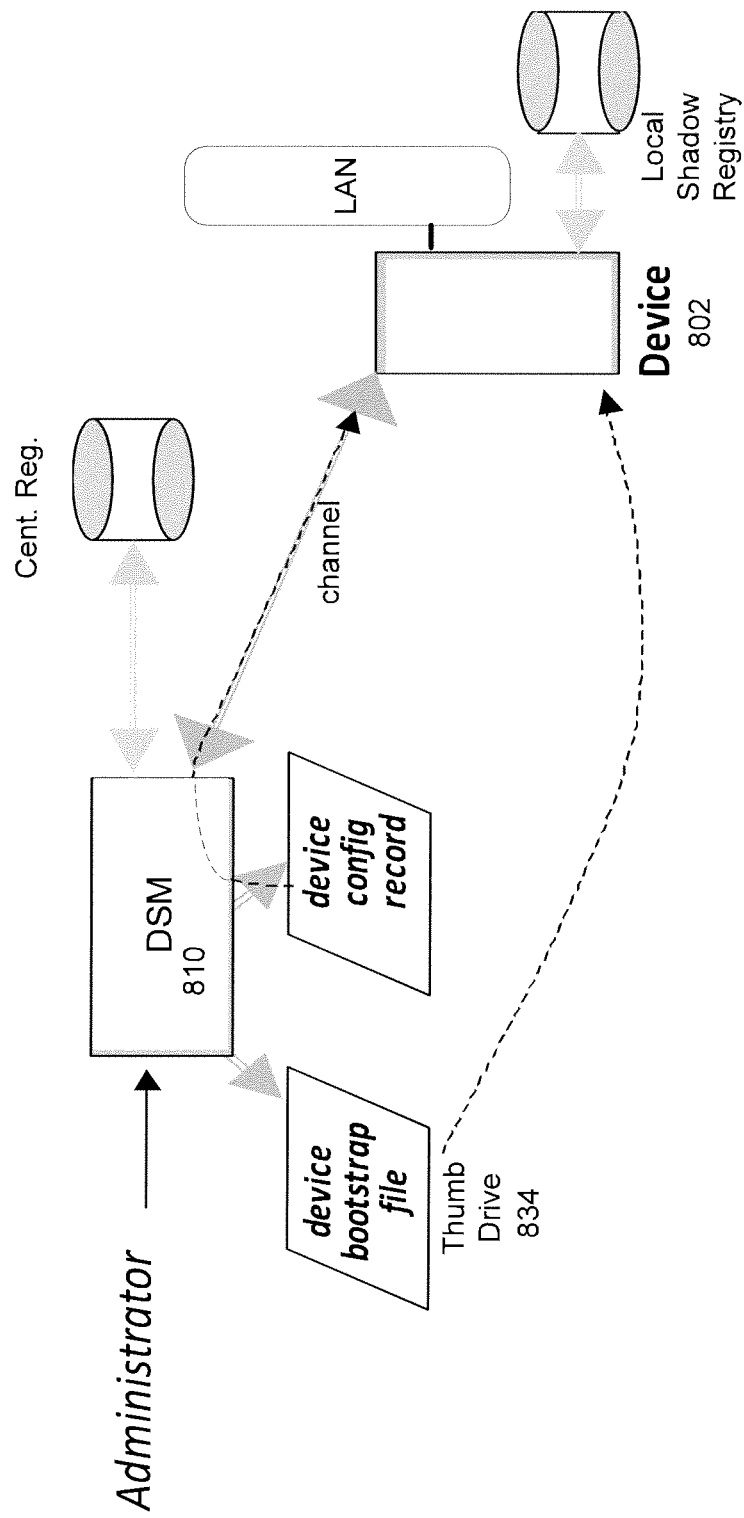
FIG. 8 illustrates a block diagram of an embodiment of the DSM distributing configuration information to the DSCs via an executable boot up file in the DSC.

FIG. 8 illustrates a block diagram of an embodiment of the DSM distributing configuration information to the DSCs, such as a first DSC 802, via an executable boot up file uploaded via a drive port 834 in the DSC 810. An administrator of the DSM 810 creates a boot up file and embeds a copy of this executable boot up file on a thumb drive. The thumb drive loaded with the executable boot up file accompanies and is shipped with the DSC device 802. The executable boot up file in the DSC 802 is scripted with code to at least 1) determine a unique ID of that individual DSC device, 2) determine the DSC's current IP address, 3) supply the DSM's IP address on the wide area network, and 4) activate code to initiate communications with the DSM 810.

The DSC device 802 uploads the boot up file from the thumb drive via the drive port 834, uses the contents of the boot up file to automatically create the secure communication channel via SSH between the DSC 802 and the DSM 810 and connects to the DSM 810 at its IP address on the WAN. The DSC 802 then authenticates itself to the DSM 810 via the unique ID, device MAC address, and/or potentially associated DNS entry. The DSM 810 then looks up the authenticating information in a reference table maintained in the DSM 810.

Referring to FIG. 7, as discussed, the device configuration engine 743 in the DSC 702 without a prompt by the DSM then sends an initial configuration file with at least the unique ID of that individual DSC device and the DSC's current IP address information via a secure communication channel, such as via a secure protocol, an encrypted email, or similar method, to the DSM (with individual devices differentiated by device ID, device MAC address and/or potentially associated DNS entry).

Referring to FIG. 6, the DSM IP redirector module 618 receives this configuration information. The DSM 610 has a user data replication manager module 645 to create a device configuration/replication file with this configuration information and additional information and to make a master copy of the device configuration file in the DSM's registry 620. The user data replication manager module 645 then distributes this configuration information back out to the appropriate DSCs in response to the DSC's registering with the DSM 610 or in response to a given DSC performing a system reset. Note, the DSM 610 may also send updates of firmware, software patches, etc. in response to the boot up call.

Referring to FIG. 7, the DSC 702 may be a stand alone device deployed in an existing network. The deployment consists of merely physically plugging in the power to a power connection and power supply circuit of the DSC, plugging in the Ethernet network connection, and inserting the supplied thumb drive into a drive port 734 (i.e. USB flash drive into USB port). That is it! Thus, the DSC 702 is a stand alone device that connects up to the existing network without needing client software to be installed on another host device in that existing network and no network configuration settings are required from an end-user to properly install the DSC onto the existing network. Therefore, avoiding that many enterprise IT departments do not allow unauthorized third party applications to be installed onto their systems. The DSC 702 then resides on the existing network and mediates communication onto that LAN. No networking knowledge is necessary and access to this remote device is automatically configured. No end-user configuration or software installation is required to properly install the DSC onto the existing network.

An auto discovery presence manager program 730 resident in each DSC 702 finds networked equipment on the existing LAN and establishes an instant point of presence on that local network. The discovery presence manager program 730 discovers associated devices on the network by using a polling technique. The discovery presence manager program 730 has a Graphical User Interface (GUI) 749 to ask a user of network whether each discovered piece of network equipment protected by the firewall should be visible for remote access by at least the DSM. The DSC device 702 then collects and sends out the initial configuration file with the designated visible network device information to the central management DSM via the secure channel, which the DSM automatically registers both the local DSC and any associated network devices in the DSM-hosted Identity Registry. This information can then be made available via dynamic DNS, LDAP and DHCP, as well as associated web-based directory service application interfaces. In an embodiment, the Auto Discovery service 730 waits to discover network equipment on the existing LAN until the DSM sends back a copy of the master configuration file as well as any firmware and software updates.

The graphic user interface 749 is configured for the DSM administrator to configure Automated Device Discovery for each associated DSC. Multiple individual scan records may be created which specify either SNMPv1, SNMPv2 or another protocol as the search mechanism. When Automated Device Discovery is activated, scan records are copied to the appropriate DSC, which shall use them to initiate periodic scans of their local LAN for attached network devices.

When a device is discovered, the DSC shall create a Discovery record, which shall include as a minimum the IP address of the discovered device, the discovery protocol used to locate the discovered network device and the identifier of the discovering DSC. The resulting Discovery records shall be replicated back to the DSM for use by the DSM's Association, Configuration and Monitoring Service components. Each such Discovery record shall be assigned a unique ID, which shall allow the administrator to disambiguate references to individual configurations and discovered devices. The DSM then sends back a local copy for the DSC to store in its registry 728.

Thus, each DSC 702 of the two or more DSCs serves as a local registration authority, accepting registration requests from associated network devices on the existing local LAN, as well as polling for associated network devices on the local LAN. The DSC 702 will maintain a registry 728 of associated devices and will be able to automatically register both themselves and associated devices with its parent DSM registry. Each DSC 702 feeds this data to the parent DSM. Each DSC 702 participates in device discovery and directory service by registering associated devices discovered by using polling techniques.

Referring to FIG. 6, the DSM 610 provides centralized administration of the distributed system of DSC across the wide area network and proxy communications between those DSCs. An administrator with a GUI 651 from the DSM 610 creates a full device configuration record in Central Registry 620 from the initial configuration file with additional information including making pair associations of an existing device configuration with a specific discovered device, persistent state information, etc. The Central Configuration Registry 620 stores the configuration information and the user data replication manager makes a master copy of the device configuration file stored in the DSM 610.

Figure 3:
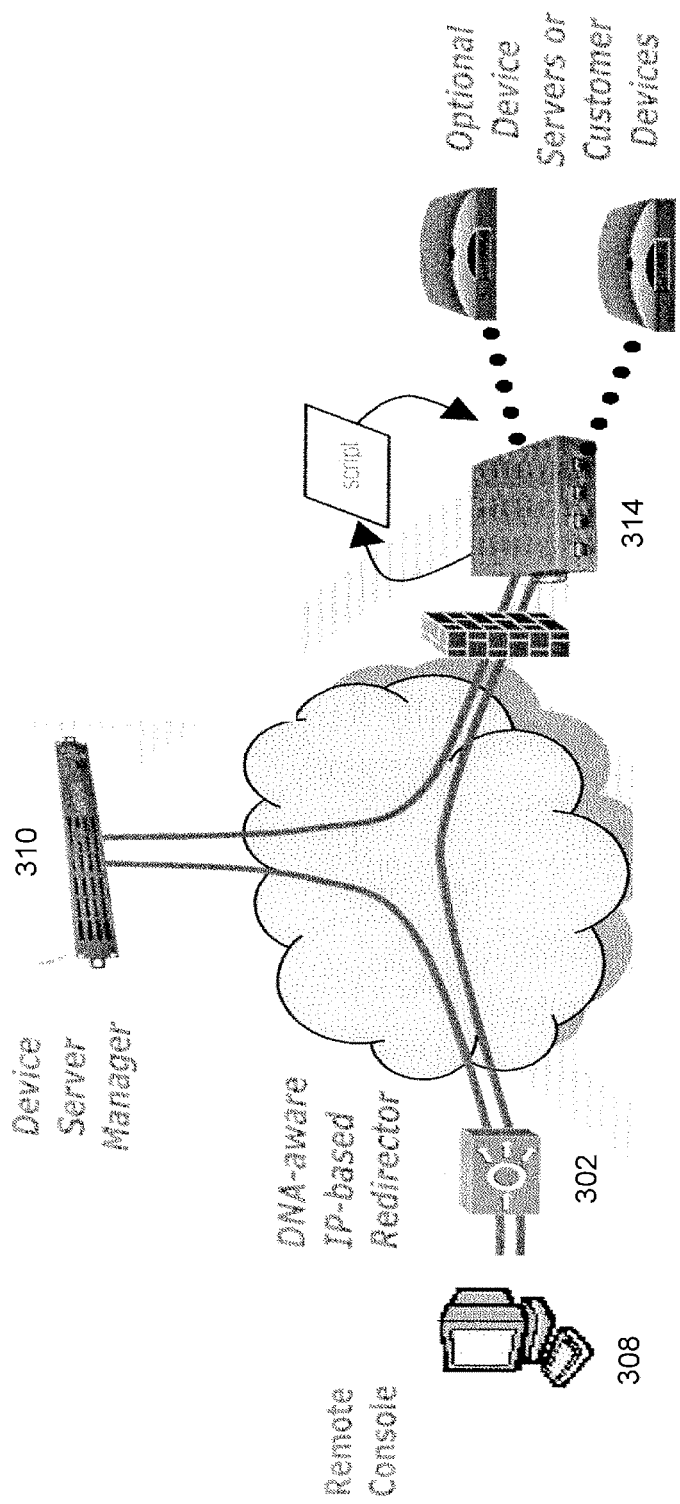
FIG. 3 illustrates a block diagram of an embodiment of a system having a central DSM and local DSCs to access to and from networked devices in networks protected by firewalls.

FIG. 3 illustrates a block diagram of an embodiment of a system having a central DSM and local DSCs to access to and from networked devices in networks protected by firewalls. The virtual device network is created by the DSM 310 and DSCs 302, 312 and the network devices associating with each DSC. The VDN in FIG. 3 operates similarly to the above descriptions for FIGS. 1, 2a, and 2b except where noted. The IP redirector may have portions resident in both the DSC and the DSM.

Referring to FIG. 7, the IP redirector may include the access subsystem device management system and registry. The Conduit Manager 724 in the DSC notifies local DSC processes that the SSH session to the DSM has been fully established. The conduit's SSH shell session is attached to the IP redirector program portion in the DSM. The IP redirector program then sends periodic beacon packets that the DSC can use to ensure the direct communication tunnel is established and active. Some minor protocol capabilities may be present to allow the DSC/DSM 110 to perform bandwidth/latency estimates. SSH's TCP port-forwarding feature can be used to pass all other control and tunnel data between the DSM and DSC. The Conduit Manager 724 may also negotiate the "remote" port it can listen on from the DSM.

Figure 4:
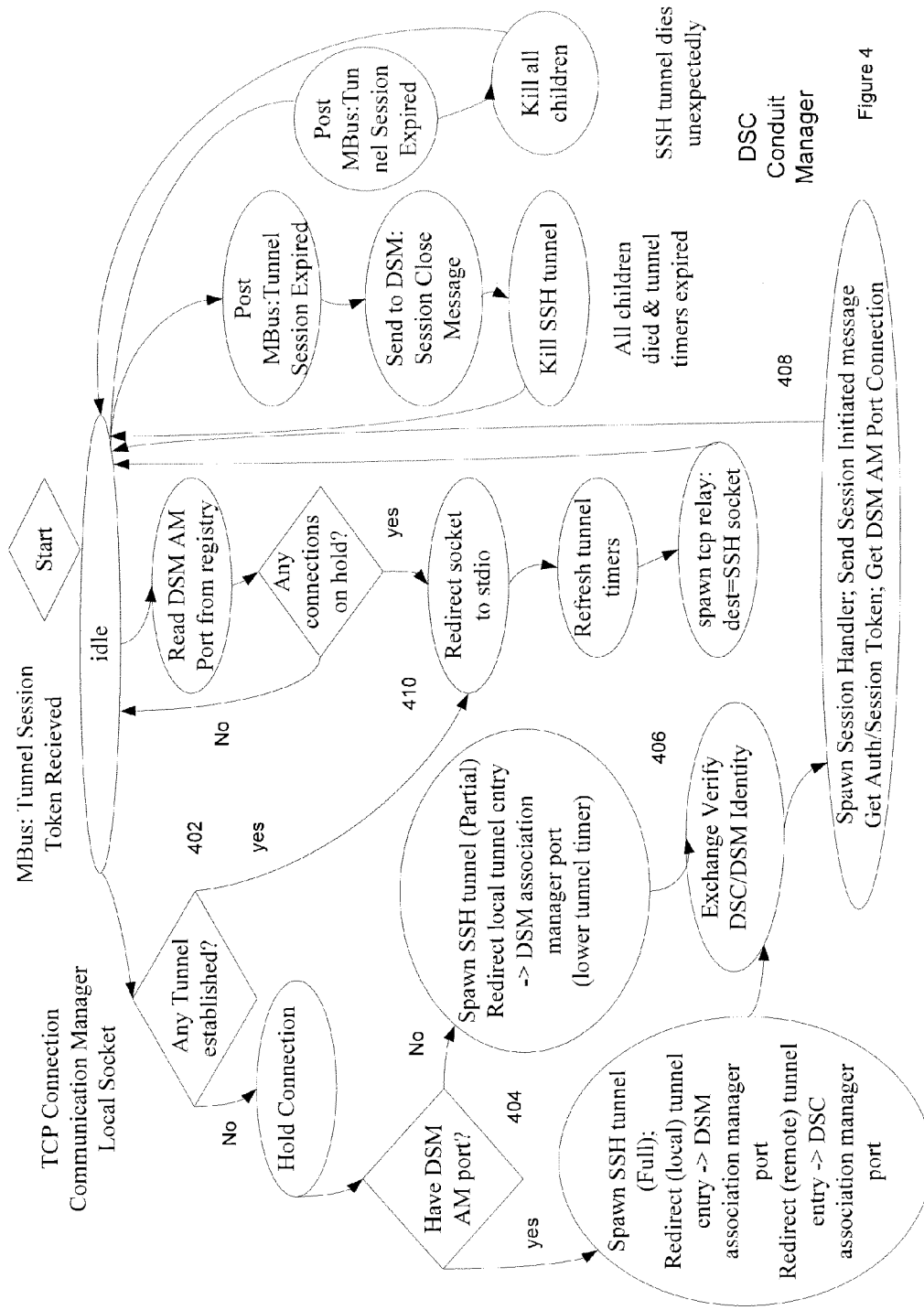
FIG. 4 illustrates a state diagram of an embodiment of the Conduit Manager in the DSC.

FIG. 4 illustrates a state diagram of an embodiment of the Conduit Manager in the DSC. The Conduit Manager contains code to start and stop the direct TCP communication tunnel, determine when this direct TCP communication tunnel is idle or unexpectedly interrupted, etc. In block 402, when a pending TCP connection request comes in, the Conduit manager checks to see if any SSH tunnel is already established with the DSM. If not, in block 404, the Conduit manager establishes a full or partial SSH session. In block 406, the Conduit manager negotiates authentication of that DSC with the DSM by each verifying their identity.

After the SSH session has been fully established and an identity of the DSC responsible for the point of origin is authenticated with the DSM, then in block 408 traffic is allowed to pass in both directions in the direct communication tunnel.

In block 410, if the tunnel has already been established, the DSC redirects the socket and refreshes the tunnel timer.

Referring to FIG. 6, the DSM 610 has an IP redirector program that consists of multiple routines implemented in software, logic or a combination of both. The DSC may also contain a portion of the IP redirector program. The IP redirector program may include portions in the DSC such as the Conduit Manager in the DSC, which has code scripted to provide basic secured network communication and manage the conduit tunnel between a DSC and the DSM and the Tunnel Manager in the DSC.

The Tunnel Manager 624 portion of the IP redirector in the DSM 610 has code scripted to provide a secured multiplexed TCP session between the DSM and a DSC operating in Demux mode and the DSM and a DSC operating in Mux mode.

The above processes may be implemented by software code written in a given programming language, hardware logic components and other electrical circuits, or some combination of both.

Accordingly, in an embodiment, the software used to facilitate the algorithms discussed above can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
a device service manager server (DSM) having a network access module configured to cooperate with two or more device service controllers (DSCs) and serve as a central management station for allocating and assigning Virtual IP (VIP) addresses to network devices to proxy communications for networked devices on a local area network (LAN) where each DSC resides and the DSM is located exterior from the network devices on the LAN where communications associated with the assigned VIP addresses are being routed to, wherein the DSM assigns a first VIP address to a first DSC and establishes a route from the first VIP address to a destination network device, based on corresponding DSC and network device information stored in a registry of the DSM; and
wherein first DSC preallocates a pool of VIP addresses available in its LAN, then sends the pool of VIP addresses to the DSM and the DSM maintains two pools for assigning VIP addresses, a smaller pool of VIP addresses used for requests from unknown public IP addresses and a larger pool of VIP addresses used for requests from known IP addresses registered with the DSC.

2. The apparatus of claim 1, wherein the network access module in the DSM is configured to create a pairing of 1) each DSC's unique identifier and the VIP address of the local network assigned with the DSC, the network access module also creates a pairing of 2) a unique identifier of a host DSC controller and a real IP address of a host console network device associated with the unique identifier of DSC on a first local area network, as well as a pairing of 3) a real IP address of a destination network device and a unique identifier of a destination DSC on a second local area network, and the DSM stores these pairings in the registry of the DSM.

3. The apparatus of claim 2, wherein the DSC's unique identifier may be a unique ID associated with each DSC, or a MAC address assigned to that DSC and the networked devices are located behind a firewall on a local area network relative to a location of the DSM on a wide area network.

4. The apparatus of claim 1, wherein the DSM has a VIP address Routing Table in the DSM's registry that stores at least real IP addresses of each DSC and the network devices on the local area network, which are designated as visible by a user of the local area network, and the VIP addresses, and routes to devices, where the DSM uses the information in the VIP address Routing Table to map a VIP address assigned by the DSM to a real IP address associated with a given DSC to establish the route.

5. The apparatus of claim 4, wherein the network access module instructs DSC to use DHCP to pick up VIP addresses from a pool of VIP address pre-identified by DSC to DSM and the network access module automatically updates routing information in the VIP Routing Table to be able to map real IP addresses with assigned VIP addresses and store that association in the DSM registry.

6. The apparatus of claim 5, wherein an association pairing is held stored while a connection is active and then placed in a queue of stored pairs until replaced by new active connection needing a pairing and then overwritten on a least frequently used basis.

7. The apparatus of claim 1, wherein the network access module of the DSM has code scripted to instruct a first DSC to find out what VIP addresses are available in its local network and then report those VIP addresses to an association manager in the DSM and the DSC obtains the VIP addresses using a local automatic address server, and then copies the VIP addresses back to the association manager in the DSM.

8. The apparatus of claim 1, wherein the network access manager in the DSM establishes a route from a domain name to a remote target Device via address mapping service via a Dynamic DNS to set up a domain name pointing to the VIP address and maps the specified pairing of the VIP address assigned to first DSC and its unique ID to the pairing of the IP address assigned to a second DSC and its unique associated with the domain name.

9. The apparatus of claim 1, wherein the network access manager in the DSM cooperates with a domain name server to update one or more address records in the DNS to allow automatic domain name-to-IP address resolution and the DNS is communicatively connected and operated by the DSM and creates a VIP address for each active connection.

10. The apparatus of claim 1, wherein the network access manager in the DSM cooperates with a domain name server and the DNS merely needs to allocate a VIP address when a DNS query occurs, where a first DSC pre-allocates a pool of VIP addresses available in its LAN, then sends the pool of VIP addresses to the DSM and the DSM assigns and uses VIP address entries from the pool as needed.

11. The apparatus of claim 1, wherein the network access manager in the DSM cooperates with a network manifold in each DSC to set up a VIP address for each DSC, and can then handle TCP/IP connections to any arbitrary port on any target device and the network manifold is configured to manage the VIP address pool for the LAN that DSC resides on.

12. A method, comprising:
cooperating with two or more device service controllers (DSCs) on a local area network (LAN) where each DSC resides and a first DSC proxies communications for network devices on a first LAN;
creating two or more pools of VIP address available in the local network, wherein a smaller pool of VIP addresses used for requests from unknown public IP addresses and a larger pool of VIP addresses used for requests from known IP addresses registered with the DSCs;
instructing a first DSC to obtain available local virtual IP (VIP) addresses from a device that is located exterior from the LAN where each DSC resides;
allocating and assigning VIP addresses to network devices to proxy communications for the networked devices on the first local area network (LAN) where the first DSC resides;
instructing a second DSC to obtain available local VIP addresses from the device that is located exterior from the LAN where each DSC resides;

allocating and assigning VIP addresses to network devices to proxy communications for the networked devices on the second local area network (LAN) where the second DSC resides;

creating a pairing of 1) each DSC's unique identifier and the VIP address of the local network assigned with the DSC, 2) a unique identifier of host DSC controller and a real IP address of a host console network device associated with the unique identifier of DSC on a first local area network, as well as a pairing of 3) a real IP address of a destination network device and a unique identifier of a destination DSC on a second local area network;

storing these pairings in a registry of the device; and mapping these stored pair to establish a route from first DSC to the destination network device; and establishing a route from the assigned VIP address to a destination network device on a LAN associated with a given DSC, based on stored pairs of information stored in the device.

* * * * *